Jan. 7, 1969    B. C. DUDLEY    3,420,118
REMOTELY CONTROLLED REAR-VIEW MIRROR ASSEMBLIES FOR VEHICLES
Filed Nov. 1, 1966    Sheet 1 of 2
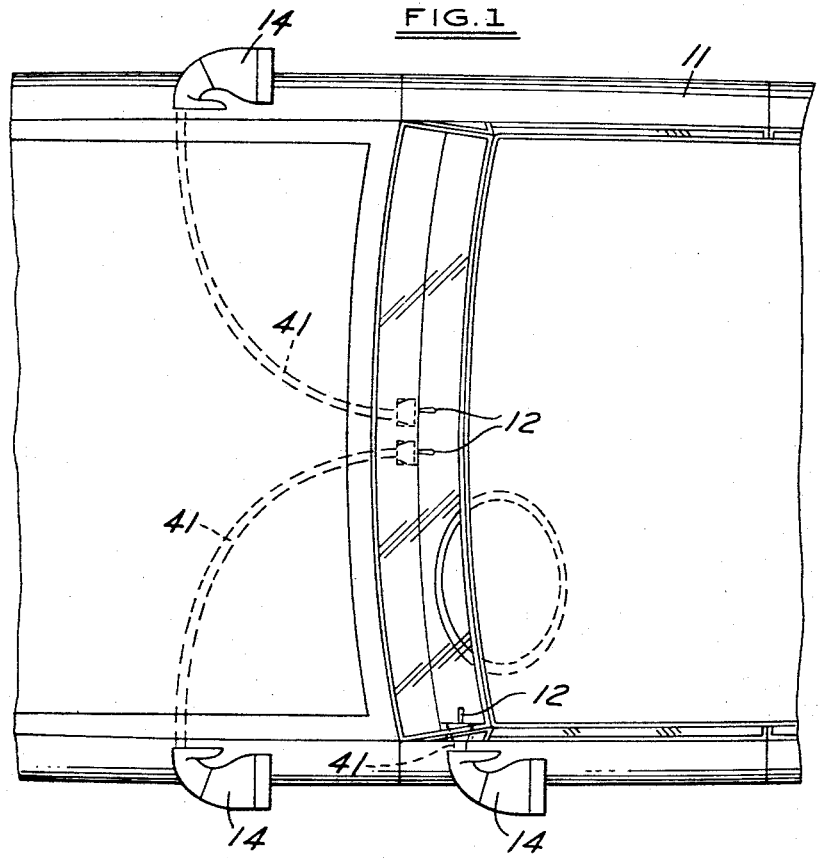
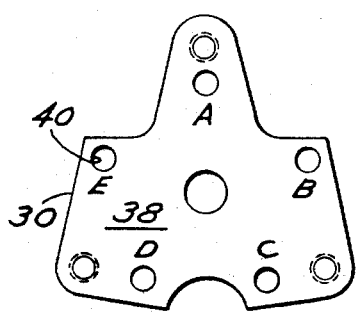
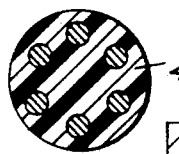
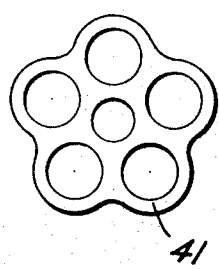
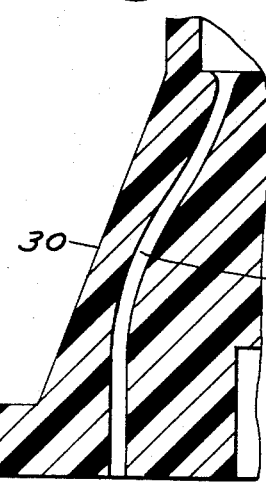
INVENTOR
BRUCE C. DUDLEY
BY
ATTORNEY

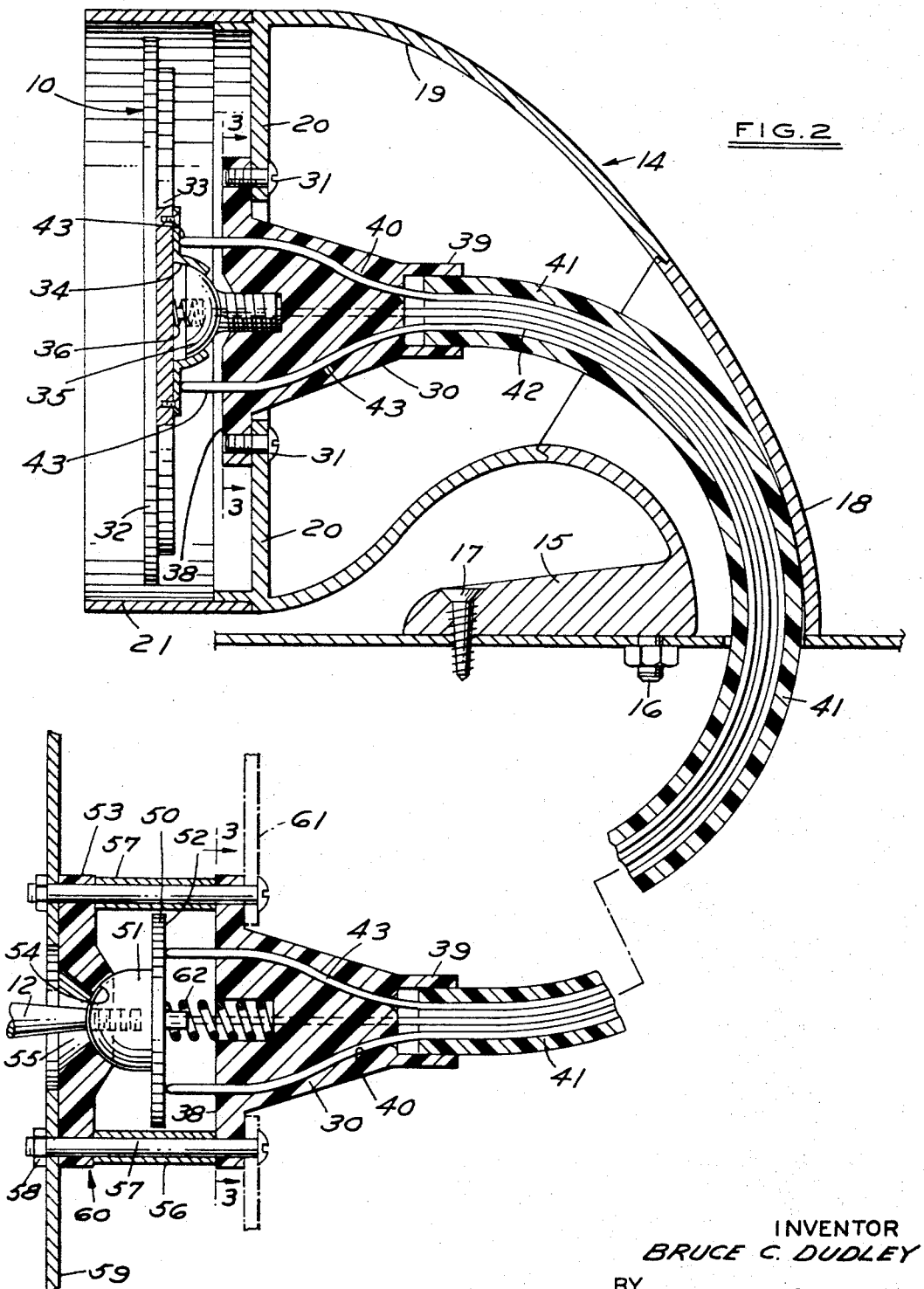

United States Patent Office 3,420,118
Patented Jan. 7, 1969

3,420,118
REMOTELY CONTROLLED REAR-VIEW MIRROR ASSEMBLIES FOR VEHICLES
Bruce C. Dudley, 4304 Covered Bridge Road, Bloomfield Hills, Mich. 48013
Filed Nov. 1, 1966, Ser. No. 591,190
U.S. Cl. 74—501
Int. Cl. F16c 1/12; B60r 1/06
3 Claims

ABSTRACT OF THE DISCLOSURE

A remotely controlled rear view mirror assembly having a universally mounted mirror spaced from a universally mounted actuator with each having adaptor heads interconnected by a cable sheath housing push-rods leading between the mirror and the actuator so that motion of the actuator is transferred to the mirror via the push-rods.

---

This invention relates to remotely controlled rear-view mirror assemblies for vehicles and in particular to novel actuating and adjusting mechanism therefor.

Rear-view mirrors which are located on the outside of vehicles and which are angularly adjusted from inside the passenger compartment are well known and their high utility recognized and appreciated. However, the several devices of the prior art have not been found entirely satisfactory from many standpoints. The vehicle bodies differ from one another. Their body panels are variously curved and angled. The interior trim and intermediate construction vary. This is especially true of different makes of vehicles and even true from model to model of the same make. These variances coupled with different body sizes and styles, such as sport, small, medium, and large cars and commercial pick-ups, trucks, and busses create many problems in making and mounting a remotely controlled mirror which provides proper view and which operates satisfactorily. Some mirrors will only mount on the driver's door. Others only mount on the windshield side post. Some must be mounted on the body or fender ahead of the door. Their actuator location inside the passenger compartment is also limited.

With the foregoing in view it is the primary object of the invention to provide a remotely controlled mirror assembly which lends itself adaptably for mounting at any selected location on a vehicle and actuating and adjusting mechanism therefor which lends itself more adaptably to positioning in any selected location inside the passenger compartment.

Another object of the invention is to provide actuating and adjusting mechanism for a remotely controlled rear view mirror assembly which is simple in design and construction, inexpensive to manufacture, easy to mount and install on a vehicle, easy and accurate in operation, and which has few parts.

Another object of the invention is to provide actuating and adjusting mechanism for a remotely controlled rear view mirror assembly which has simple inexpensive component parts so that the device may have high quality and still be sold at a reasonable price.

Another object of the invention is to provide a reasonably priced remotely controlled rear view mirror assembly so that a driver may economically afford to mount two such mirrors on the right and left hand sides of a vehicle so that he may visually survey his entire rear quadrent which is necessary in present traffic to be commensurate with due safety precautions.

Another object of the invention is to provide actuating and adjusting mechanism for a remotely controlled rear view mirror assembly which uses a push action only so that pull connections are eliminated and push-pull binding conflict obviated.

Another object of the invention is to provide actuating and adjusting mechanism for a remotely controlled rear view mirror assembly which is suited in design to use synthetic resin parts which are easily molded and which do not rust, which are not subject to electrolysis, which do not need lubrication, and which operate without maintenance and failure over a long period of time.

These and other objects of the invention will become apparent by reference to the following description of a remotely controlled mirror assembly having the novel actuating and adjusting mechanism embodying the invention taken in connection with the accompanying drawings, in which:

FIG. 1 is a fragmentary top plan view of a vehicle showing three mirror assemblies mounted thereon in remote locations with their control portions mounted adjacent the driver position showing the interconnecting cable sheath in dotted lines.

FIG. 2 is an enlarged cross-sectional view of a mirror assembly and actuator mechanism with the cable sheath foreshortened and broken away.

FIG. 3 is a face view of an adaptor head such as taken on the line 3—3 of FIG. 2.

FIG. 4 is an enlarged partial cross-sectional axial view of an adaptor head as seen in FIG. 2 showing the preferred rod channels.

FIG. 5 is a cross-sectional view of an actuator rod cable sheath having six separate slide channels; and FIGS. 6, 7, and 8 are cross-sectional views of rod cable sheaths having channels shaped to house five, four, and three actuator rods respectively.

Referring now to the drawings wherein like numerals refer to like and corresponding parts throughout the several views, the remotely controlled rear view mirror assembly and the novel actuating and adjusting mechanism embodying the invention shown therein to illustrate the invention comprises a mirror 10 mountable on the outside of a vehicle body 11 at any selected location and an actuating lever 12 mountable on the inside of the vehicle body in any selected location. The adjusting and actuating mechanism extends between the mirror 10 and the lever 12.

More particularly, the mirror 10 lies in a housing 14 having a foot plate 15 for abutting the vehicle body 11. The foot plate 15 may be secured to the body 11 by a stud 16 and a screw 17 and has a projecting hollow neck 18 which enlarges into a hollow bell portion 19. The bell portion 19 has inwardly extending support flanges or arms 20 and a projecting shroud 21. The housing 14 may be made in three parts as shown or otherwise as desired.

An adaptor head 30 is mounted on the arms 20 such as by screws 31. The mirror 10 lies within the shroud 21 and may have a back plate 33. An internally spherically walled socket 34 is attached to the back plate 33. An externally spherically walled boss 35 lies in the socket 34. A spring 36 may lie between the back plate 33 and the boss 35 urging the socket 34 and boss 35 into frictional engagement. A stud 37 on the boss 35 is screwed in an aperture of the adaptor head 30. The mirror 10 is thus mounted for compound angular adjustment.

The adaptor head 30 has a face 38 spaced from the mirror back plate 33 at one end and a connector flange 39 at the other end. The adaptor head 30 has a plurality of equally spaced slide channels 40 preferably curving relative to its longitudinal axis and extending from one end within the flange 39 to the other end and opening through the face 38. These channels 40 may be slightly bell-mouthed at the end as seen in FIG. 4. A cable sheath 41 having one or more slide channels 42 is connected to the flange 39. A plurality of push rods 43 are housed in the cable sheath 41 and extend through and lie in the channels 40. Each push rod 43 has a mirror end projecting outwardly of the face 38 and in contact with the mirror back plate 33. The cable sheath 41 and the push rods 43 extend from the mirror 10 through the vehicle body 11 to a point adjacent the actuator lever 12.

The actuator lever 12 is attached to a wobble member 50 having a partial ball 51 and a plate 52. A block member 53 has a ball faced socket 54 engaging the partial ball 51 and an opening 55 surrounding the lever 12. An adaptor head 30 lies spaced from the plate 52. Spacers 56 lie between the head 40 and the block 53. Bolts 56 extend through the head 40, spacers 56, and block 53. Nuts 58 on the bolts 57 secure the parts together. These parts are the actuator assembly 60. The assembly 60 may be mounted on a body panel 59 or on brackets 61 as desired. The end of the cable sheath 41 is secured in the flange 39. The push-rods 43 extend through the channels 40 of the adaptor head 30 of the actuator assembly 60 and each rod 43 has a plate end extending outwardly past the face 38 in contact with the wobble plate 52. A spring 62 may lie between the adaptor head 30 and the wobble member 50 urging the partial ball 51 into frictional engagement with the socket 54.

The cable sheath 41 and the push rods 43 may be any length so as to extend between the mirror 10 and the actuator assembly 60. The sheath 41 may be metal, rubber, or synthetic resin tubing or have portions made of various materials. Thus the sheath 41 may be metal tubing adjacent the mirror assembly 10 and actuator assembly 60 and be synthetic resin tubing in its intermediate portion if desired. The sheath 41 may have a single internal channel for housing the push rods 43 and be internally shaped as illustrated in FIGS. 6–8 to suit the number of push rods 43 housed therein. Also the sheath 41 may have any plurality of individual internal channels such as six and five as shown in FIGS. 5 and 6. Also separate small tubes each individually housing a push rod 43 may be used to form the cable sheath 41.

The face 38 of the adaptor head 30 may have identifying marks at the various channels such as alphabetical designations shown in FIG. 3. By this means the channels may be easily identified and oriented at the adaptor head 30. The push rods 43 may be identified by colors to aid in decerning each rod at the ends. In this way the orientation of the mirror assembly 10 and the actuator assembly 60 may be easily established. In other words if the A, B, C, D, and E channels of both heads are respectively located near twelve, two, five, seven, and ten o'clock positions and the same rod extends between like designated channels then the mirror 32 and the actuator handle are oriented to make like angular movements so that, for example, if the operator moves the handle 12 to a three o'clock position the mirror 32 also moves to three o'clock position. To accomplish this the heads 30 of the actuator assembly 60 and the mirror assembly are inverted 180° relative to one another.

In assembling and mounting the device on a vehicle, the mirror housing 14 may be completely integrated together with the cable sheath 18 and the push rods 43. An aperture is formed in the car body 11 and the cable sheath 18 and rods 43 inserted there-through and the foot 15 attached to the body over the aperture by the stud 16 and screw 17. This mounts the mirror housing 14. The actuator assembly 60 is then mounted with the push rods 43 inserted in the channels 40 and the cable sheath connected to the flange 39 at the actuator assembly 60. This mounts the actuator assembly 60. In this regard the actuator assembly 60 may lie behind an aperture in the dash board, may depend below the dash board on a bracket, lie behind a door panel, etc.

The push rods 43 are preferably made of flexible yet semi-rigid material such as synthetic resin. The adaptor heads 30 and various other parts also may be made of such material.

It can now be seen that the mirror housing 14 may be mounted on the outside of the vehicle body as desired and that the actuator assembly 60 may be mounted on the inside of the body as desired and that the cable sheath 41 and push rods 43 lead easily between them.

In operation the operator moves the actuator handle 12 in the direction he wishes to move the mirror 32. For example, if he moves the handle 12 toward three o'clock the wobble plate 52 moves toward channels B and C and away from channels E and F. Thus the push rods in channels B and C are pushed against the mirror back plate 32 but because of the 180° inversion of the heads 30, the push rods in channels B and C engage the mirror back plate 33 diametrically opposite three o'clock so that the mirror 32 is moved toward the three o'clock position. This applies equally to the other angular positions of the handle 12 and mirror 32 so that mirror and handle move in the same direction.

I claim:
1. An actuating mechanism particularly suited to universally angularly adjust a mirror located outside a vehicle from a position inside a vehicle comprising,
    a first adaptor head mountable in a housing, said adaptor head having an end for facing and lying spaced from a mirror mounted for universal angular movement; said head having angularly spaced channels for facing a mirror in axial projection;
    push-rods leading to and lying in each said channel having an end projecting from said head to contact a mirror, an actuator end, and an intermediate portion,
    a block having a ball seat,
    universal motion means on said block including a ball portion lying in said ball seat of said block, a wobble plate on said ball portion, and an actuator handle connected to said ball portion,
    a second adaptor head spaced from said block having an end facing and spaced from said wobble plate; said second head having angularly spaced channels facing said wobble-plate in axial projection;
    means supporting said adaptor head and said block relative to one another;
    said actuator end of each said push-rod leading through one said channel of said second adaptor head with its actuator end in contact with said wobble-plate, and
    a cable sheath surrounding said push-rods in their intermediate portion between said adaptor heads and connected to said adaptor heads slidably confining said push-rods as to axial movement relative to one another between said adaptor heads;
    said actuating mechanism being capable of adjustably moving a universally mounted mirror adjacent said first adaptor head by manually angularly moving said wobble-plate by said actuator handle to exert pushing force on one or more push-rods in one angular location and releasing pushing force on one or more push-rods in an opposite angular location relative to both said wobble-plate and to a mirror to axially outwardly project one or more of said push-rods relative to a mirror to angularly move a mirror and to permit axial inward released movement of one or more push-rods as moved by a mirror in its movement whereby a mirror outside a vehicle may be angularly pushed by said wobble-plate through said push-rods to a desired adjusted angular position by an operator from inside a vehicle.

2. An actuating mechanism as set forth claim 1, including
    a mirror housing for attachment to the outside of a vehicle,
    a mirror in said housing, and
    universal motion means mounted in said housing and connected to and supporting said mirror allowing compound angular movement of said mirror relative to said housing;
said first adaptor head lying in said mirror housing spaced from said mirror with said mirror ends of push-rods in contact with said mirror.

3. A remotely controlled rear view mirror assembly particularly suited for universally angularly adjusting a mirror located outside a vehicle from a position inside a vehicle comprising, a mirror housing for attachment to the outside of a vehicle, a mirror in said housing, universal motion means mounted in said housing and connected to and supporting said mirror allowing compound angular movement of said mirror relative to said housing, a first adaptor head mounted in said housing having an end facing and spaced from said mirror; said head having angularly spaced channels facing said mirror in axial projection;

a push-rod leading to and lying in each said channel having a mirror end projecting from said head in contact with said mirror, a remote actuator end, and an intermediate portion, a block having a ball seat, universal motion means on said block including a ball portion lying in said ball seat of said block, a wobble-plate on said ball portion, and an actuator handle connected to said ball portion, a second adaptor head spaced from said block having an end facing and spaced from said wobble-plate; said second head having angularly spaced channels facing said wobble-plate in axial projection;

means supporting said adaptor head and said block relative to one another;

each said push-rod actuator end leading through one said channel of said second adaptor head with its actuator end in contact with said wobble-plate, and a cable sheath surrounding said push rods in their intermediate portion between said heads and connected to said heads slidably confining said push-rods as to axial movement relative to one another between said adaptor heads;

said mirror being universally angularly adjustably positionable by manually angularly moving said wobble-plate by said actuator handle to exert pushing force on one or more push rods in one angular location and releasing pushing force on one or more push-rods in an opposite angular location relative to both said wobble-plate and said mirror to axially outwardly project one or more of said push-rods relative to said mirror to angularly move said mirror and to permit axial inward released movement of one or more push-rods to be moved by said mirror in its movement whereby said mirror outside a vehicle is angularly pushed by said wobble-plate through said push-rods to a desired adjusted angular position by an operator from inside a vehicle.

References Cited
UNITED STATES PATENTS 3,183,736  5/1965  Jacobson _____ 74—501

MILTON KAUFMAN, *Primary Examiner.*